United States Patent [19]
Bae

[11] Patent Number: 5,812,282
[45] Date of Patent: Sep. 22, 1998

[54] APPARATUS AND METHOD FOR PROTECTING SPECIFIC NUMBER IN FACSIMILE SYSTEM

[75] Inventor: Ki-Kwon Bae, Daegu, Rep. of Korea

[73] Assignee: SamSung Electronics Co., Ltd., Suwon, Rep. of Korea

[21] Appl. No.: 679,434

[22] Filed: Jul. 8, 1996

[30] Foreign Application Priority Data

Jul. 8, 1995 [KR] Rep. of Korea .................. 20113/1995

[51] Int. Cl.[6] ....................................................... H04N 1/32
[52] U.S. Cl. ........................................... 358/442; 395/488
[58] Field of Search ..................................... 395/488, 113, 395/114; 358/404, 444, 442; 345/172

[56] References Cited

U.S. PATENT DOCUMENTS

| | | | |
|---|---|---|---|
| 4,839,827 | 6/1989 | Hirata et al. ............................ | 364/518 |
| 5,134,653 | 7/1992 | Satomi et al. ........................... | 379/355 |
| 5,220,438 | 6/1993 | Yamamoto ............................... | 358/404 |
| 5,301,035 | 4/1994 | Hayafune ................................ | 358/440 |
| 5,521,716 | 5/1996 | Itoh ........................................ | 358/402 |

*Primary Examiner*—Thomas D. Lee
*Assistant Examiner*—Jerome Grant, II
*Attorney, Agent, or Firm*—Robert E. Bushnell, Esq.

[57] ABSTRACT

An apparatus for protecting a specific number in a facsimile system includes an operating panel having a protection key for activating a protection function, and a plurality of keys for enabling input of the specific number. A display unit displays a message indicating that the protection key has been input in response to the input of the protection key from the operating panel. A memory stores the specific number. A central processing unit deletes the specific number from the memory to perform the protection function in response to the input of the protection key. A printer prints a list from the memory to confirm whether performance of the protection function is completed.

14 Claims, 2 Drawing Sheets

APPARATUS AND METHOD FOR PROTECTING SPECIFIC NUMBER IN FACSIMILE SYSTEM

CROSS-REFERENCE TO RELATED APPLICATIONS

This application makes reference to, incorporates the same herein, and claims all benefits accruing under 35 U.S.C. §119 arising from an application for *Apparatus And Method For Protecting Specific Number In Facsimile System* earlier filed in the Korean Industrial Property Office on 8 Jul. 1995 and there duly assigned Ser. No. 20113/1995.

BACKGROUND OF THE INVENTION

The present invention relates to a facsimile system, and more particularly, to an apparatus and method for protecting a specific number in a facsimile system by deleting from memory the specific number sought to be protected.

A conventional facsimile system generally includes various function keys, and input of these function keys provides a user with many services. As the information age progresses, facsimile systems continue to provide users with a wide range of communication services. According to this trend, facsimile systems are more than ever before storing information, such as specific personal identification numbers, that is sensitive and private to the facsimile user. In many situations, it is possible for unauthorized individuals to obtain this information by accessing various lists of information that are stored within the facsimile system.

One way that certain information can be accessed is simply by pressing a redial key of the facsimile system. In response to input of the redial key, many facsimile systems provide a visual display of the telephone number being redialed. U.S. Pat. No. 5,301,035 entitled *Facsimile Apparatus Having Redialing Function* issued to Hayafune, for example, provides this function. In view of the trend of facsimile systems being used to store information that is private to the individual user, I believe that the facsimile system should be equipped with a feature to protect stored information, namely specific numbers, from access. The present invention is directed towards addressing this problem.

SUMMARY OF THE INVENTION

Therefore, it is an object of the present invention to provide an improved facsimile system.

It is another object to provide an apparatus and method for protecting a specific number stored within a facsimile system that is input for a communication service in the facsimile system.

It is still another object to provide an apparatus and method for protecting a specific number stored within a memory of a facsimile system by deleting the specific number from memory.

It is yet another object to provide an apparatus and method for preventing unauthorized individuals from gaining access to private information stored within a facsimile system.

To achieve these and other objects, the present invention provides an apparatus for protecting a specific number in a facsimile system. The apparatus contemplates an operating panel having a protection key for activating a protection function, and a plurality of keys for enabling input of the specific number. A display unit displays a message indicating that the protection key has been input in response to the input of the protection key from the operating panel. A memory stores the specific number. A central processing unit deletes the specific number from the memory to perform the protection function in response to the input of the protection key. A printer prints a list from the memory to confirm whether performance of the protection function is completed.

These and other objects can also be achieved with a method for protecting a specific number in a facsimile system. The method contemplates the steps of displaying a message indicating that a protection key has been input and activating a protection function in response to the input of the protection key; displaying the specific number, storing the specific number in a memory, and then deleting the specific number from the memory to execute the protection function, when the specific number is input after the input of the protection key; and confirming that performance of the protection function is completed.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings, wherein.

DETAILED DESCRIPTION OF THE INVENTION

In the following description, many specific details are set forth to provide a more thorough understanding of the present invention. It will be apparent, however, to those skilled in the art, that the present invention may be practiced without these specific details. In other instances, well known features have not been described in detail so as not to obscure the present invention.

Throughout this application, the term "specific number" is used to represent a number dialed when a user executes an additional service after, for example, a facsimile information service or a telephone banking service has been initiated. In the case of the facsimile information service, a standard seven-digit telephone number (e.g., 700–1000) is first entered, and then the specific number (e.g., 99, 02, 45, etc.) is additionally entered. Similarly, in the case of the telephone banking service, the standard seven-digit telephone number is first entered, and then the specific number is additionally entered. In these cases, a specific number represents information, such as a personal identification number, that the user presumably wishes to protect from access by other parties.

Figure 1:
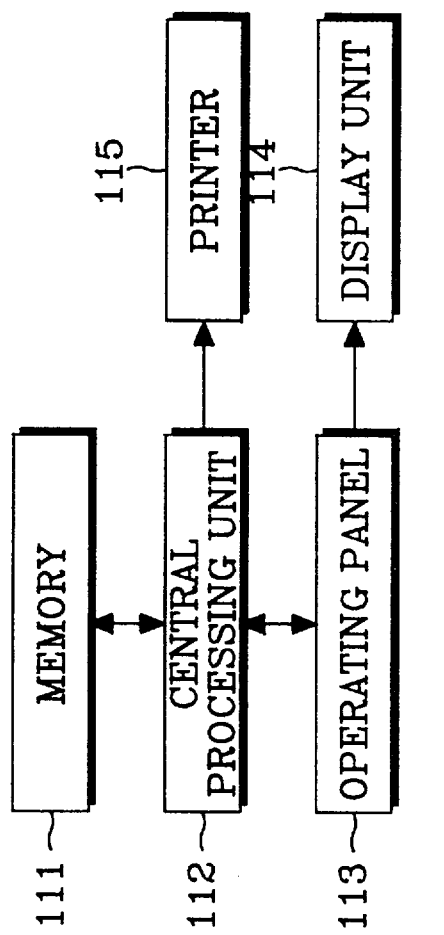
FIG. 1 is a block diagram of an apparatus for protecting a specific number in a facsimile system constructed according to the principles of the present invention.

Turning now to the drawings and referring to FIG. 1, a block diagram of an apparatus for protecting a specific number in a facsimile system constructed according to the principles of the present invention is shown. In FIG. 1, an operating panel 113 includes a protection key, a redial key, and a plurality of numeric keys and service function keys. A central processing unit 112 connected to operating panel 113 activates a protection function in response to input of the protection key, and operates and manages the facsimile system during execution of the protection function. A display unit 114 connected to operating panel 113 displays a message indicating when the protection key is input, and also provides display of a specific number when input via the numeric keys on operating panel 113. The specific number is stored in a memory 111 by central processing unit 112. Memory 111 is composed of various list buffers and redial buffers, and stores information, including specific numbers and information corresponding to the different service function keys. A list stored in the list buffer is used for managing facsimile transmissions and confirming any message. The specific number stored in memory 111 is deleted by central processing unit 112 during execution of the protection function. In order to confirm whether execution of the protection function is completed (i.e., the specific number is deleted), a printer 115 is provided for printing various lists. It is also possible to confirm whether the specific number is deleted by depressing the redial key on operating panel 113. That is, deletion of the specific number is confirmed when the redial key is depressed and the corresponding telephone number, without the specific number, is displayed on display unit 114.

Figure 2:
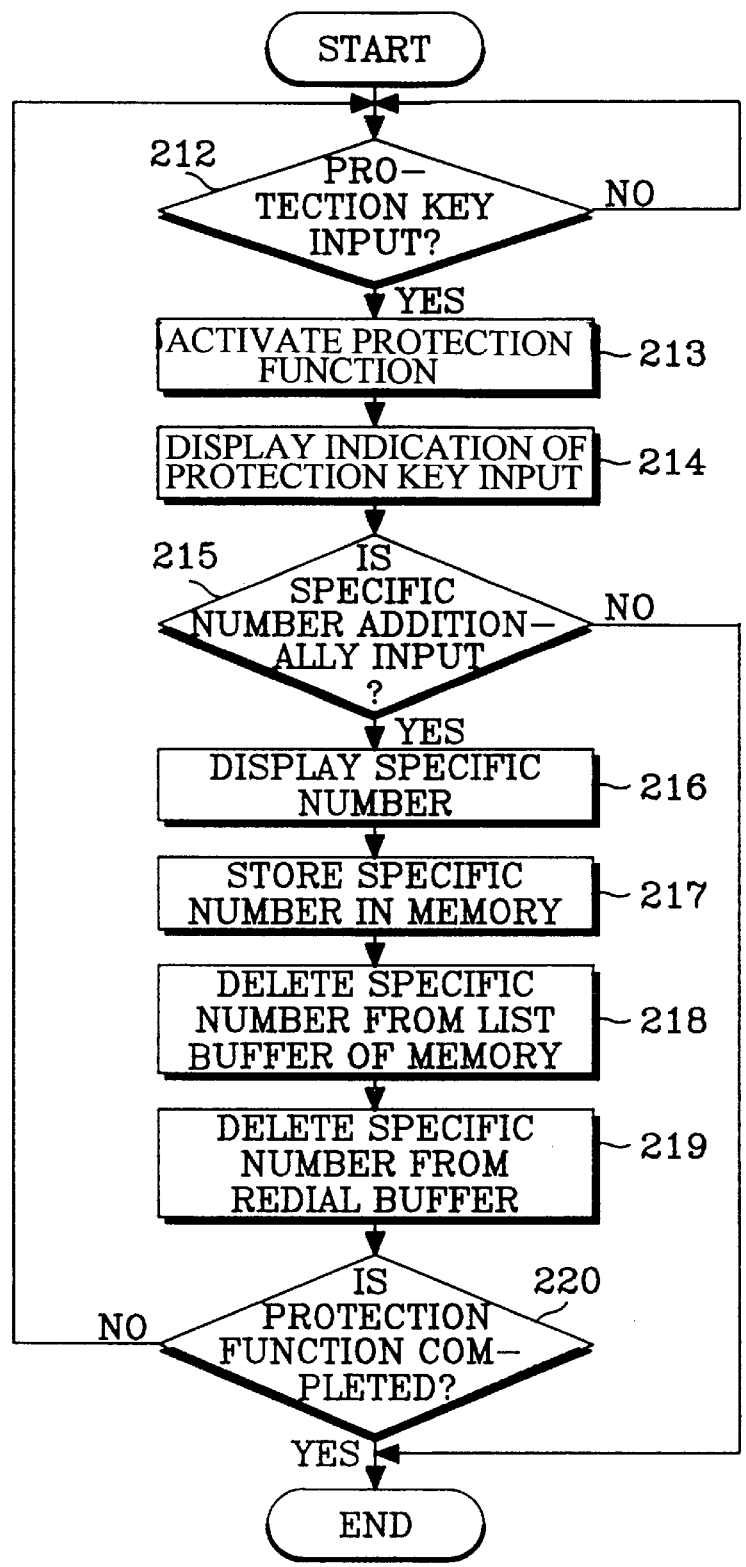
FIG. 2 is a flow chart illustrating a method for protecting a specific number in a facsimile system according to the principles of the present invention.

The method for protecting the specific number in the facsimile system according to the principles of the present invention will now be in described in detail with reference to FIG. 2.

In step 212, central processing unit 112 determines whether the protection key is input from operating panel 113. If the protection key is not input, step 212 is repeated. Upon input of the protection key, central processing unit 112 activates the protection function, in step 213. A message indicating that the protection key has been input is then displayed on display unit 114, in step 214. In step 215, central processing unit 112 determines whether the specific number is additionally input with a given telephone number via operating panel 113. When the specific number is additionally input in step 215, the specific number is then displayed on display unit 114, in step 216. Alternatively, if the specific number is not input in step 215, the method is terminated. In step 217, the specific number is stored in memory 111. Then, in step 218, central processing unit 112 deletes the specific number from the various list buffers of memory 111. In step 219, central processing unit 112 also deletes the specific number from the redial buffer of memory 111. Thereafter, central processing unit 112 proceeds to step 220 to determine whether performance of the protection function is completed. Confirmation that the protection function is completed (i.e., specific number is deleted) is facilitated by printing the memory list that contains many telephone numbers and specific numbers via printer 115. If the printed list contains the given telephone number, without the corresponding specific number, the user confirms that the specific number is deleted from the stored lists. Moreover, confirmation that the specific number is deleted can be obtained by pressing the redial key on operating panel 113. That is, deletion of the specific number is confirmed when depression of the redial key causes the given telephone number, without the specific number, to be displayed on display unit 114. When performance of the protection function is completed in step 220, the method is terminated. On the other hand, if the protection function is not completed, the method proceeds back to step 212.

As mentioned above, central processing unit 112 deletes the specific number from memory 111 after the protection function is activated by depression of the protection key. Hence, the facsimile system constructed in accordance with the principles of the present invention protects the specific number from access.

While there have been illustrated and described what are considered to be preferred embodiments of the present invention, it will be understood by those skilled in the art that various changes and modifications may be made, and equivalents may be substituted for elements thereof without departing from the true scope of the present invention. In addition, many modifications may be made to adapt a particular situation to the teaching of the present invention without departing from the central scope thereof Therefore, it is intended that the present invention not be limited to the particular embodiments disclosed as the best mode contemplated for carrying out the present invention, but that the present invention includes all embodiments falling within the scope of the appended claims.

What is claimed is:

1. An apparatus for protecting a specific number in a facsimile system, comprising:

a facsimile unit coupled to a telephone unit equipped with a telephone handset;

an operating panel having a protection key for activating a protection function;

a display unit for displaying a message indicating that said protection key has been input after the input of said protection key;

a keypad providing a plurality of keys enabling input of a specific number immediately after said display unit displays said message;

a memory for storing said specific number after said specific number is input;

a central processing unit performing an operation in dependence upon said specific number stored in said memory and then deleting said specific number from said memory to perform said protection function; and a printer for printing a list from said memory to confirm whether performance of said protection function is completed.

2. A method for protecting a specific number in a facsimile system, comprising the sequential steps of:

operating a protection key activating a protection function, said protection key being mounted on a facsimile unit coupled to a telephone unit equipped with a telephone handset;

displaying a message indicating that said protection key has been operated;

inputting a specific number to said facsimile system;

displaying said specific number, storing said specific number in a memory, performing an operation in dependence upon said specific number stored in said memory, and then deleting said specific number from said memory to execute said protection function; and confirming that performance of said protection function is completed.

3. The method as claimed in claim 2, wherein said deleting step is comprised of deleting said specific number from a list buffer and a redial buffer of said memory.

4. The method as claimed in claim 2, wherein said confirming step is comprised of printing a list stored in said memory.

5. The method as claimed in claim 2, wherein said confirming step is comprised of inputting a redial key.

6. A method for protecting a specific number in a facsimile system, comprising the sequential steps of:

operating a protection key activating a protection function, said protection key being mounted on a facsimile unit coupled to a telephone unit equipped with a telephone handset;

displaying a message indicating that said protection key has been operated;

inputting a specific number to said facsimile system;

displaying said specific number, storing said specific number in a memory and performing an operation in dependence upon said specific number stored in said memory;

deleting said specific number from a list buffer and a redial buffer of said memory; and confirming that performance of said protection function is completed.

7. The method as claimed in claim 6, wherein said confirming step is comprised of printing a list stored in said memory.

8. The method as claimed in claim 6, wherein said confirming step is comprised of inputting a redial key.

9. A method for protecting a specific number in a facsimile system, comprising the sequential steps of:

operating a protection key activating a protection function to protect a specific number, said protection key being mounted on a facsimile unit coupled to a telephone unit equipped with a telephone handset;

determining whether said protection key is input from an operating panel of said facsimile system;

inputting said specific number to said facsimile system;

determining whether said specific number is input from said operating panel after said protection key is operated;

executing said protection function by deleting said specific number from a memory of said facsimile system when said specific number has been input from said operating panel after said protection key has been operated; and then confirming whether execution of said protection function is completed.

10. The method as claimed in claim 9, wherein said confirming step is comprised of printing a list stored in said memory.

11. The method as claimed in claim 9, wherein said confirming step is comprised of inputting a redial key on said operating panel.

12. The method as claimed in claim 9, wherein said deleting step is comprised of deleting said specific number from a list buffer and a redial buffer of said memory.

13. The method as claimed in claim 12, wherein said confirming step is comprised of printing a list stored in said list buffer of said memory.

14. The method as claimed in claim 13, wherein said confirming step is comprised of inputting a redial key on said operating panel.

* * * * *